(12) United States Patent
Sharma

(10) Patent No.: US 12,067,171 B1
(45) Date of Patent: Aug. 20, 2024

(54) SYSTEMS AND METHODS FOR OPERATING ARTIFICIAL REALITY DEVICES USING GESTURES

(71) Applicant: Meta Platforms, Inc., Menlo Park, CA (US)

(72) Inventor: Priyanka Sharma, Cupertino, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/737,483

(22) Filed: May 5, 2022

Related U.S. Application Data

(60) Provisional application No. 63/231,908, filed on Aug. 11, 2021.

(51) Int. Cl.
*G06F 3/01* (2006.01)
*G02B 27/01* (2006.01)
*G06T 19/00* (2011.01)
*G09B 21/00* (2006.01)

(52) U.S. Cl.
CPC ......... *G06F 3/017* (2013.01); *G02B 27/0172* (2013.01); *G06F 3/011* (2013.01); *G06T 19/006* (2013.01); *G09B 21/00* (2013.01); *G09B 21/001* (2013.01); *G09B 21/009* (2013.01)

(58) Field of Classification Search
CPC ..... G06F 3/017; G06F 3/011; G02B 27/0172; G06T 19/006; G09B 21/00; G09B 21/001; G09B 21/009
See application file for complete search history.

(56) References Cited

U.S. PATENT DOCUMENTS

| | | | |
|---|---|---|---|
| 2015/0049012 A1* | 2/2015 | Liu | G06F 3/016 345/156 |
| 2019/0101977 A1* | 4/2019 | Armstrong-Muntner | G06F 3/011 |
| 2021/0142531 A1* | 5/2021 | Echevarria Vallespi | G06T 11/001 |
| 2021/0223864 A1* | 7/2021 | Forsland | G06F 1/163 |

* cited by examiner

*Primary Examiner* — Adam R. Giesy
(74) *Attorney, Agent, or Firm* — BakerHostetler

(57) ABSTRACT

Systems and methods are provided for operating an artificial reality device using gestures. In various exemplary embodiments, an artificial reality device may receive information initiating a gesture recognition mode via the artificial reality device, and cause a camera associated with the artificial reality device to operate in the gesture recognition mode. The artificial reality device may further receive at least one image of a gesture captured by the camera and identify and evaluate the gesture. The gesture may be indicative of a user command. The artificial reality device may also execute the user command, and may generate feedback confirming execution of the user command.

20 Claims, 9 Drawing Sheets

800

SYSTEMS AND METHODS FOR OPERATING ARTIFICIAL REALITY DEVICES USING GESTURES

CROSS-REFERENCE TO RELATED APPLICATIONS

This application claims priority to U.S. Provisional Application No. 63/231,908, filed Aug. 11, 2021, entitled "Systems And Methods For Operating Artificial Reality Devices Using Gestures," which is incorporated by reference herein in its entirety.

TECHNICAL FIELD

The present disclosure generally relates to systems and methods for operating artificial reality devices based on utilizing one or more detected gestures.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. AR, VR, MR, and hybrid reality devices often provide content through visual means, such as through a headset, e.g., glasses.

The artificial reality content presented through such devices may include video, audio, haptic feedback, or some combination thereof, and any of which may be presented in a single channel or in multiple channels, such as stereo video that produces a three-dimensional effect to the viewer. Content may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Because many artificial reality devices utilize audio and/or visual features, individuals with audio and/or visual disabilities may face unique challenges during the user experience. AR headsets and glasses, for example, may present visual prompts during an initial set up. Individuals with visual impairments, e.g., blindness, may have difficulties interacting with such products, especially if there is no audio introduction or walkthrough to assist during setup. Similarly, individuals with audio impairments (e.g., deafness) may have difficulty using AR devices that utilize audio prompts or audio feedback to interact with users. Accordingly, there is a need to expand the capabilities of artificial reality devices to enable use by a variety of individuals, such as those with audio and/or visual impairments.

BRIEF SUMMARY

In meeting the described challenges, the present disclosure provides systems and methods for operating artificial reality devices. For instance, the exemplary embodiments may detect one more user gestures which may enhance the ability of users, such as for example the visually and auditorily impaired, to operate artificial reality devices.

In one exemplary embodiment, an artificial reality device using gestures is provided. The artificial reality device may include at least one processor and a non-transitory memory including computer program code instructions. The memory and computer program code instructions are configured to, with the at least one processor, cause the artificial reality device to perform operations including receiving information initiating a gesture recognition mode via the artificial reality device. The memory and computer program code instructions are also configured to, with the processor, cause the artificial reality device to cause a camera associated with the artificial reality device to operate in the gesture recognition mode. The memory and computer program code instructions are also configured to, with the processor, cause the artificial reality device to receive, via the camera, at least one image of a gesture captured by the camera. The memory and computer program code instructions are also configured to, with the processor, cause the artificial reality device to identify and evaluate the gesture. The gesture may be indicative of a user command. The memory and computer program code instructions are also configured to, with the processor, cause the artificial reality device to execute the user command in response to the evaluated gesture, and generate feedback confirming execution of the user command.

In another exemplary embodiment, a computer program product for using gestures is provided. The computer program product may include at least one non-transitory memory including computer-executable instructions stored therein. The computer-executable instructions may include program code instructions configured to receive information initiating a gesture recognition mode via an artificial reality device. The computer-executable instructions may further include program code instructions configured to cause a camera associated with the artificial reality device to operate in the gesture recognition mode. The computer-executable instructions may further include program code instructions configured to receive at least one image of a gesture captured by the camera, and identify and evaluate the gesture. The gesture may be indicative of a user command. The computer-executable instructions may further include program code instructions configured to execute the user command, and generate feedback confirming execution of the user command.

In yet another exemplary embodiment, a method for operating an artificial reality device using gestures is provided. The method may include causing, via the artificial reality device, a camera to operate in a gesture recognition mode. The method may further include receiving at least one image of a gesture captured by the camera associated with the artificial reality device. The method may further include identifying and evaluating the gesture. The method may further include executing a user command in response to the evaluated gesture. The method may further include generating feedback, via the artificial reality device, in response to execution of the user command. It will be appreciated that the methods described above may be implemented on a variety of hardware and computing devices.

In another exemplary embodiment, an artificial reality device using gestures is provided. The artificial reality device may include a headset including a display, and a camera configured to receive images, at least one processor, and a memory in communication with the processor. The memory may include instructions that, when executed by the processor, cause the artificial reality device to perform operations including causing the headset to operate in a gesture recognition mode, and receiving at least one image of a gesture captured by the camera. The memory and instructions are also configured to, when executed by the processor, cause the artificial reality device to identify and evaluate the gesture, and execute a user command in response to the evaluated gesture. The memory and instructions are also configured to, when executed by the processor, cause the artificial reality device to generate feedback in response to execution of the user command.

Gesture recognition capabilities, as discussed herein, allow users to experience personalized interactions with artificial reality devices, along with capabilities to operate artificial reality devices efficiently, despite an impairment (e.g., visual impairment, auditory impairment, etc.). Gesture recognition modules may utilize machine learning models, trained specifically for gesture recognition, and may utilize predictive techniques, confidence levels, and other methods to identify gestures, which may, but are not limited to, common hand movements and positions.

Exemplary embodiments of the present disclosure may utilize a variety of hardware, such as glasses, headsets, controllers, peripherals, mobile computing devices, displays, and user interfaces to effectuate the methods and operations discussed herein. Embodiments may further communicate with local and/or remote servers, databases, and computing systems, as discussed herein.

In various embodiments, the gesture may be one or more of a thumbs up, a thumbs down, a directional indication, a swiping motion, a pinching motion, and an expansion motion. The information initiating a gesture recognition mode may be initiated via at least one of: a user operating the artificial reality device, a physical selection, an auditory command, or a lapse of a period of time. In various exemplary embodiments, the generated feedback is provided via at least one of: an audio output, a visual output, or a sensory output. Moreover, the generated feedback may be displayed on a user interface.

As discussed herein, various systems and methods may utilize a trained machine learning model. Gestures and attributes of gestures, for example, may be evaluated using machine learning models. User commands, as determined by the identified gestures, may comprise at least one of a selection, a rejection, and an interaction with the artificial reality device.

In various exemplary embodiments, the artificial reality device may comprise glasses, a headset, a display, a microphone, a speaker, and/or any of a combination of peripherals, and computing systems.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter: however, the disclosed subject matter is not limited to the specific methods, compositions, and devices disclosed. In addition, the drawings are not necessarily drawn to scale. In the drawings.

DETAILED DESCRIPTION

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a." "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, can also be provided in combination in a single embodiment. Conversely, various features of the disclosed subject matter that are, for brevity, described in the context of a single embodiment, can also be provided separately or in any subcombination. Further, any reference to values stated in ranges includes each and every value within that range. Any documents cited herein are incorporated herein by reference in their entireties for any and all purposes.

Figure 1:
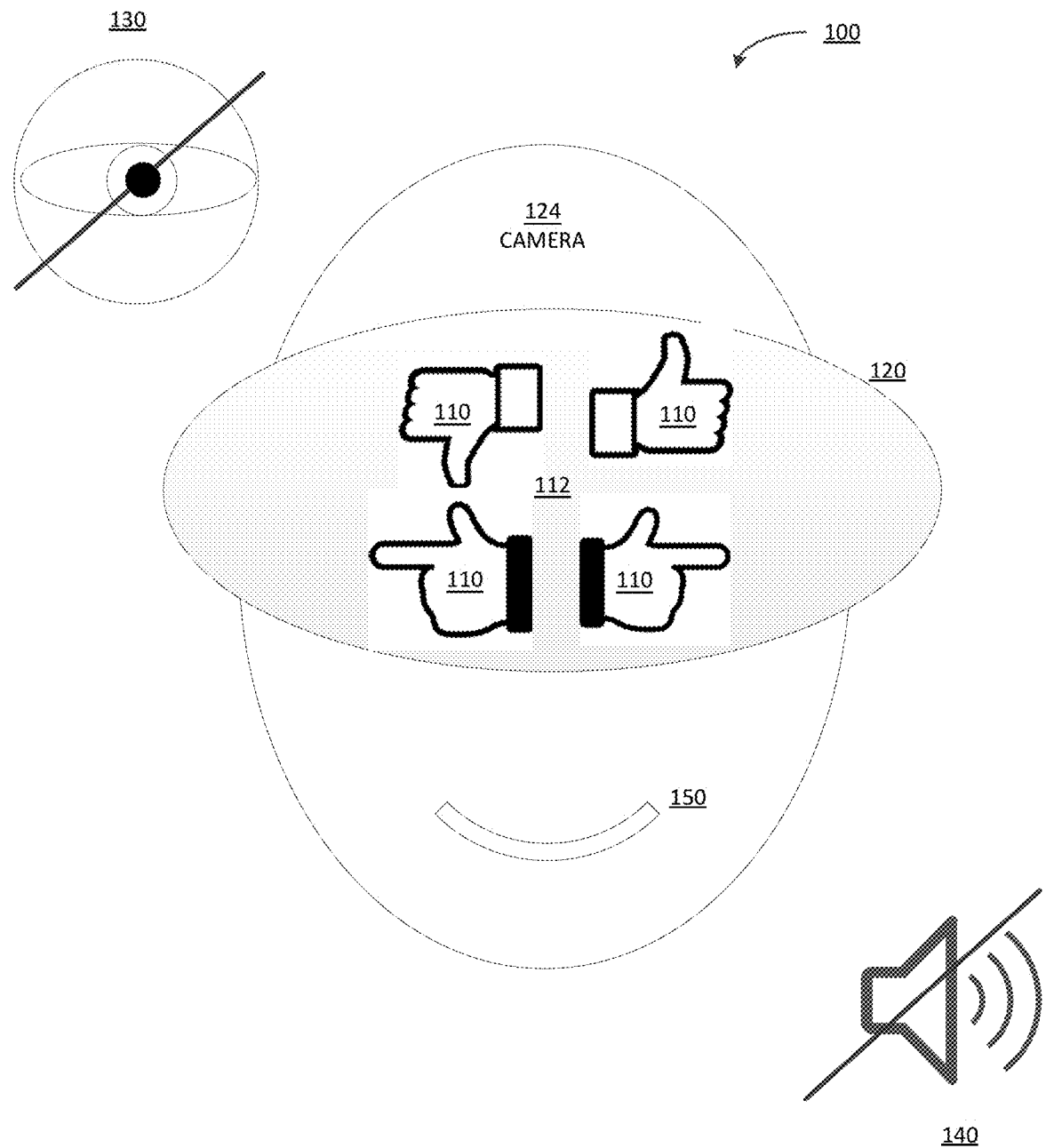
FIG. 1 illustrates an artificial reality system in accordance with exemplary embodiments of the present invention.

FIG. 1 illustrates an artificial reality system 100 that enables users with impairments and/or disabilities, e.g., audio impairment, visual impairment, etc., to operate and interact with the artificial reality device 120 (also referred to herein as device 120). In various exemplary embodiments, the artificial reality system 100 provides gesture recognition capabilities to identify, e.g., hand gestures and other movements to indicate interactions with the device 120.

In an example, the gesture recognition features may be automatically loaded and functional on the artificial reality device 120. Thus, when the device 120 is unboxed and initially operated, a user with a disability or impairment may utilize gestures to interact with the device and easily initiate setup. In other example embodiments, the artificial reality device 120 may enter into the gesture recognition mode upon one or more actions, selections, and/or events. For example, a user may select, e.g., by a physical selection, verbal command, etc., the gesture recognition mode. In other example embodiments, an event, such as a period of time, an incorrect selection, a lack of selection, and the like, may initiate the gesture recognition mode. Various systems and methods may be configured to automatically recognize gestures and commands, as discussed herein.

In one example, a user may connect a mobile computing device to an AR headset via Bluetooth. Through one or more audible sounds, or other notification methods, users may identify a successful connection between the mobile computing device to the AR headset. Various embodiments may utilize an application operating on the mobile computing device, as discussed herein. User interactions with the headset, e.g., in the above operations, to pair the device, and/or operate the device may utilize the gesture recognition modules discussed below.

The artificial reality device 120, such as headsets, glasses, and/or the like, may utilize one or more cameras 124 (e.g., camera 54 of FIG. 6), controllers, or other devices to recognize gestures 110. Gestures may be physical movements performed within a view of the gesture recognition device 112. In various embodiments, gestures may be static or motional. For example, users may indicate a thumbs up, thumbs down, swipe left, swipe right, swipe up, swipe down, direction, pinching, pointing, or other motion. In some exemplary embodiments, the gestures may be generally recognized and/or defined by a user, product software, and the like.

In various exemplary embodiments, certain gestures 110 may be utilized to address specific impairments. For example, for visual impairments 130, where a user may, for example be unable to see visual prompts on the artificial reality device 120, the artificial reality system 100 may utilize alternative mechanisms, e.g., audio prompts, and recognize gestures 110, e.g., hand motions, to receive instructions, commands, and other input in response to the prompts. For audio impairments 140, the artificial reality system 100 may utilize visual prompts and similarly receive and recognize gestures 110 to receive instructions, commands, and other input. In either or both examples, the auditory commands 150 may be used to provide instructions, commands, and responses by the user.

In another example, for a deaf or hearing-impaired individual, an AR device (e.g., AR device 120) may be configured to recognize hand gestures to assist with interactions, e.g., menu navigation, and assist with device setup, product introductions, and so forth. Audio prompts may be presented in a text format, and exemplary embodiments may allow individuals to interact with the text, using gestures including, but not limited to, the gestures discussed herein.

In yet another exemplary embodiment, for a blind or visually-impaired individual, an AR device (e.g., AR device 120) may be configured to provide audio prompts and recognize hand gestures to assist with user interactions, and so forth. In various examples, the AR device 120 may act as a mechanism for the individual to listen to songs, recordings, hold calls, and listen to videos, and generally interact with the device 120 in an auditory manner. Such auditory and gesture recognition features may be utilized to initiate setup operations and provide audio prompts and introductions to assist with setup.

Figure 2:
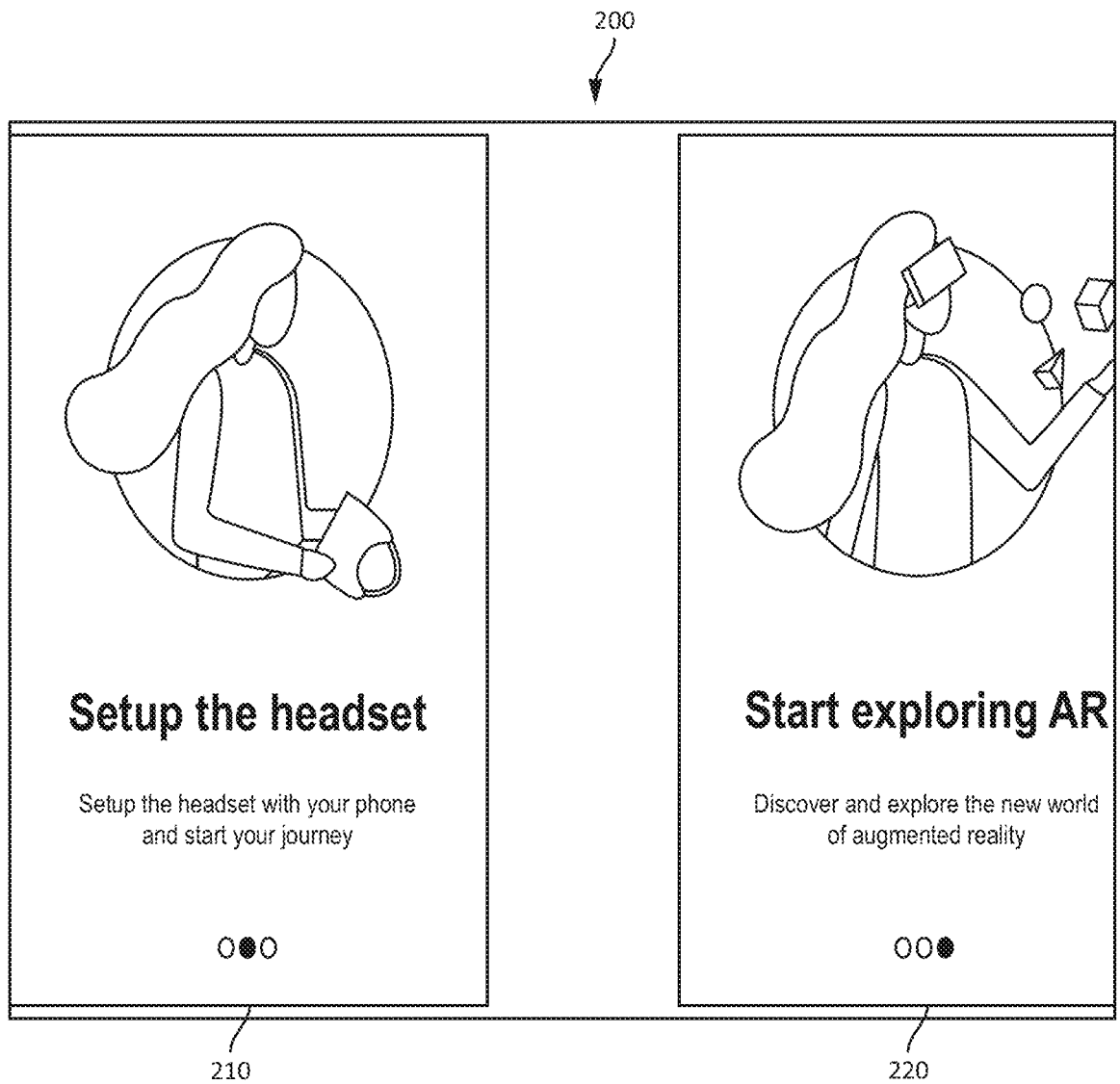
FIG. 2 provides an example interactive display in accordance with exemplary embodiments of the present invention.

FIG. 2 provides an example of an artificial reality system prompt 200 in accordance with embodiments of the present disclosure. As discussed herein, traditional AR component setup often requires audiovisual interaction. The AR component may indicate, e.g., through a visual prompt 200, that setup is required. The setup may require establishing a connection between the AR component and a computing device, such as a smartphone or other mobile computing device.

For the audio or visually impaired individual, however, it may be inefficient or even impossible to interact with the traditional prompts to setup the AR component. Accordingly, embodiments of the present disclosure may provide gesture recognition capabilities to enable such users to continue with the setup of the AR device 120.

In example embodiments, a user may gesture a swipe left or swipe right to switch between intro screens 210, 220 (also referred to herein as introduction screens 210, 220). A thumbs up gesture may indicate acceptance or affirmation of a question or selection, while a thumbs down gesture may indicate a rejection or declination. Screen 210 may serve, in examples, as a reference for a blind or visually impaired individual utilizing AR glasses, and a gesture, such as a thumbs up gesture may initiate product introduction. Screen 220 indicates a setup screen, wherein the user may initiate a setup mode and/or explore how to use the AR device 120. For either or both examples, users may motion a swipe left or right to switch between screens. Other gestures, such as a pinching gesture may cause the displayed image to zoom out, while an expansion gesture, e.g., separating a distance between two or more fingers, may cause the displayed image to zoom in. Additional gestures may be recognized by the device to indicate certain actions. As discussed herein, gesture recognition may incorporate machine learning algorithms to, for example, better recognize a user's movements or gestures, and/or to generally improve gesture recognition.

Accordingly, users may go through the AR device 120 setup using these alternative methods to connect the device 120 with a computing system, phone, computer, gaming device, controller, connected device, hardware, etc., and further operate the device 120.

In addition to visual prompts, gestures may be utilized to respond to prompts presented in other formats including, but not limited to, auditory, sensory, and/or a combination of one or more formats. Prompts may be presented in one or more formats, which may be selected by a user, to address an impairment or disability, and/or the like.

It will be appreciated that while the gesture recognition features discussed herein may serve to aid disabled individuals, such as those with audio or visual impairments, the use of such features are not limited to such individuals. The gesture recognition features may be used in addition to traditional AR component interaction methods, to improve user experience and efficiency of device operation.

Figure 3:
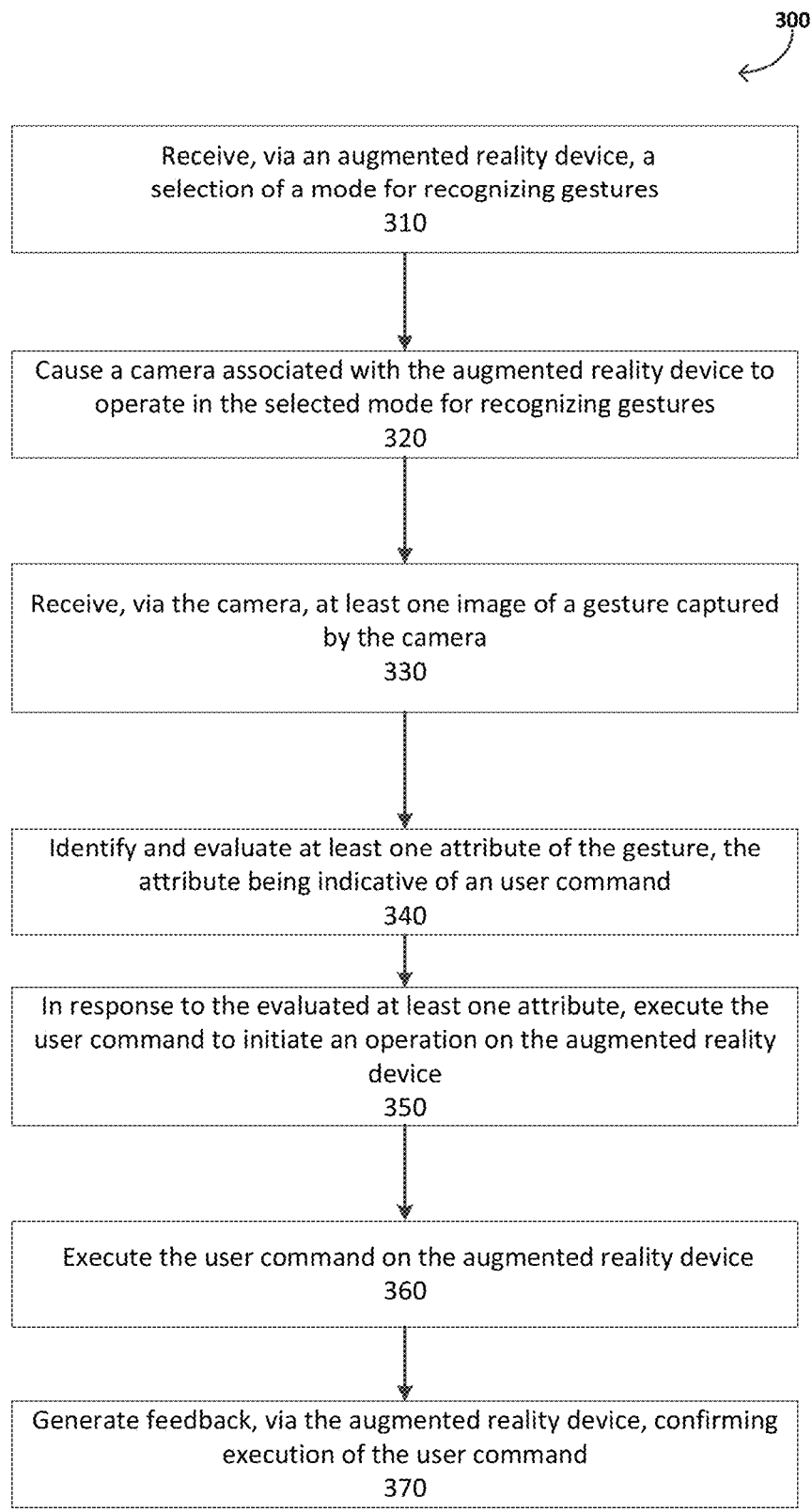
FIG. 3 illustrates an example flowchart illustrating an operation of an artificial reality device.

FIG. 3 illustrates an example flowchart illustrating example artificial reality device operations 300 in accordance with exemplary embodiments discussed herein. Systems and methods may execute one or more operations to enable gesture recognition and operation by users with an impairment.

An artificial reality device (e.g., AR device 120 (also referred to herein as augmented reality device 120)) may receive a selection indicative of a mode (e.g., a gesture recognition mode) for recognizing gestures at step 310. In examples, the gesture recognition mode may be selected via a user operating the artificial reality device, such as through a physical selection, verbal command, and/or the like. In other exemplary embodiments, the gesture recognition mode may be initiated automatically. e.g., upon unboxing a product (e.g., an AR device 120), and/or during an initial product setup. As discussed herein, the gesture recognition mode may be initiated after/in response to an action or indication demonstrating that a gesture recognition is desired or should be initiated. For example, an event, such as a period of time could lapse with no user action, or no selection is made in response to requested user input, and such events may trigger the selection of a mode for recognizing gestures.

The gesture recognition mode may cause a camera (e.g., camera 124) associated with the artificial reality device to operate in the selected mode for recognizing gestures at step 320. In exemplary embodiments, a camera 124 may be initiated to receive images. Such images may be directed to a particular area, such as a viewing area in front of a headset or glasses device. The camera may be configured to capture at least one image indicative of a gesture and communicate the at least one image with the AR device 120 at step 330. In various embodiments, the camera may be configured to receive images of the viewing area and the AR device 120 may continuously analyze the images to identify gestures.

In exemplary embodiments, the AR device 120 may be configured to identify and evaluate at least one attribute of a gesture, wherein the attribute is indicative of a user command at step 340. Attributes of the gesture may be identifying positions or markers to help identify a type of gesture. For example, attributes may comprise a hand position, or a position of one or more objects within the viewing area. For example, a thumbs up gesture may have identifying attributes related to thumb position, thumb direction, a position of the thumb relative to other fingers, and so forth. Attributes may be derived from one or more images captured by the camera, and may be indicative of a particular type of gesture. For example, a series of images may indicate a hand movement, e.g., left to right, right to left, up to down, down to up, etc., from which the AR device 120 may determine a type of gesture.

The one or more attributes and/or identified gesture(s) may be used to determine a user command. Attributes indicative of a thumbs up gesture (e.g., upwards facing thumb, closed fist), may indicate a selection, affirmation, or positive response to a question, prompt, option, etc. on the artificial reality device 120. In one example embodiment, the thumbs up gesture may be a social media "Like" sign, symbol or similar sign/symbol, which may act as a trigger/initiating gesture and one or more additional gestures may follow/appear on a display. Attributes indicative of a thumbs down gesture (e.g., upwards facing thumb, closed fist), may indicate a rejection, declination, or negative response to a question, prompt, option, etc. on the artificial reality device 120.

In response to the evaluated attribute(s), the indicated user command may be executed to initiate an operation on the artificial reality device at step 350, then execute the user command on the artificial reality device at step 360. Examples of user operations may include, but are not limited to those discussed herein, such as selections, rejections, positive responses, negative responses, adjustments of viewing areas, changing between screens, and otherwise operating features of the artificial reality device 120.

Feedback regarding the user command may be generated at step 370 via the artificial reality device. In exemplary embodiments, the feedback may confirm the user command, such as a selection of a prompt, a positive response to a question, and/or the like. In various exemplary embodiments, feedback may be generated via audio, visual, and/or sensory methods. A connected screen may depict the execution of the user command. The screen may be on a headset, associated with a connected computing device, depicted on a smartphone or mobile computing device, and so forth. In other exemplary embodiments, the artificial reality device 120 may provide audible feedback regarding the execution of a user command. Sensory feedback including, but not limited to, vibrations and haptic feedback may further be implemented instead of or in addition to any of the other techniques discussed herein. Such sensory feedback may also be provided via the artificial reality device 120 and/or other peripherals and computing devices associated with the artificial reality device 120.

Figure 4:
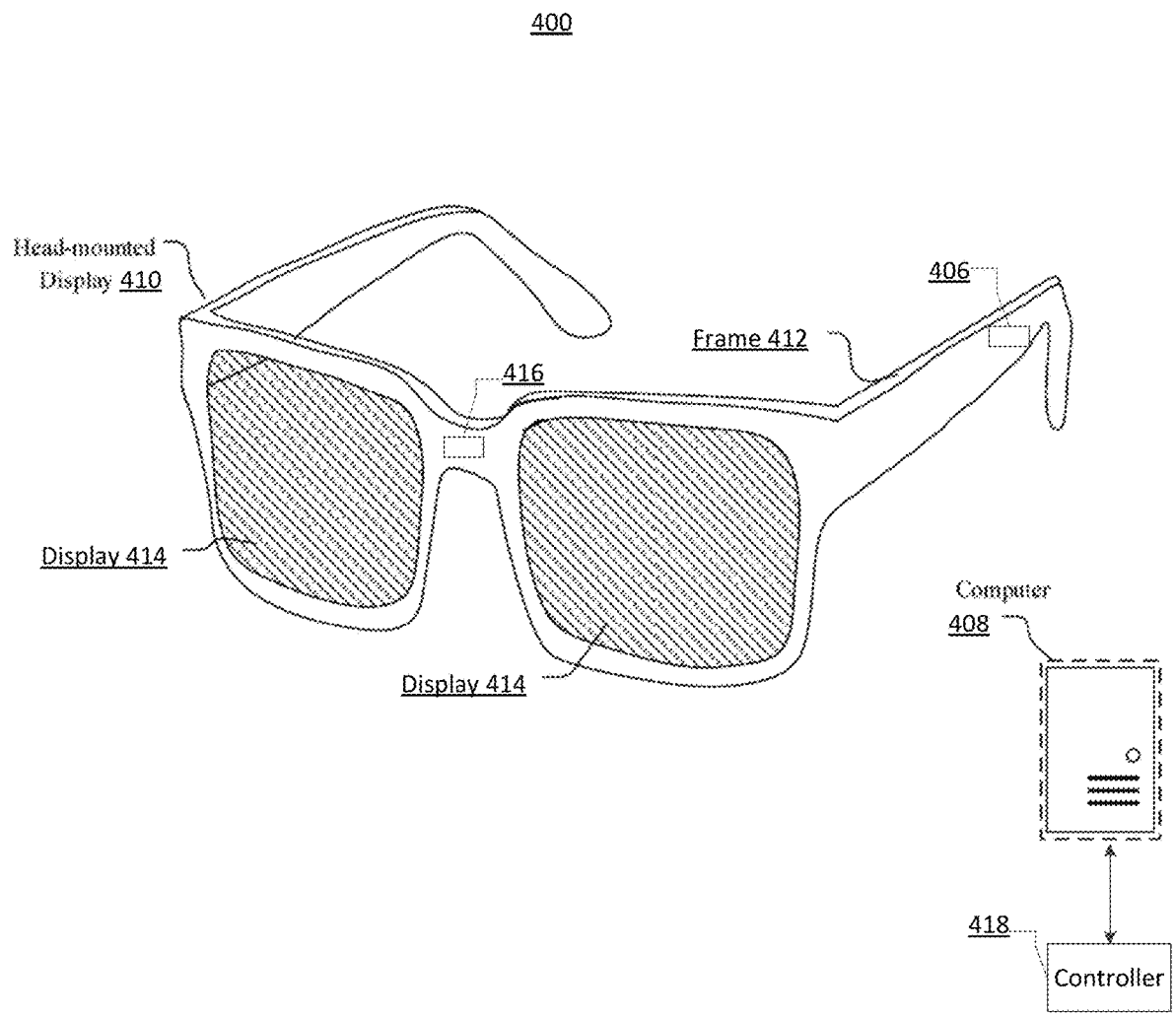
FIG. 4 illustrates an artificial reality system comprising a headset, in accordance with exemplary embodiments of the present invention.

FIG. 4 illustrates an example artificial reality system 400. The artificial reality system 400 may include a head-mounted display (HMD) 410 (e.g., glasses) comprising a frame 412, one or more displays 414, and a computing device 408 (also referred to herein as computer 408). The displays 414 may be transparent or translucent allowing a user wearing the HMD 410 to look through the displays 414 to see the real world and displaying visual artificial reality content to the user at the same time. The HMD 410 may include an audio device 406 (e.g., speaker/microphone 38 of FIG. 6) that may provide audio artificial reality content to users. The HMD 410 may include one or more cameras 416 which may capture images and videos of environments. The HMD 410 may include an eye tracking system to track the vergence movement of the user wearing the HMD 410. In one example embodiment, the camera(s) 416 may be the eye tracking system. The HMD 410 may include a microphone of the audio device 406 to capture voice input from the user. The artificial reality system 400 may further include a controller 418 (e.g., processor 32 of FIG. 6) comprising a trackpad and one or more buttons. The controller may receive inputs from users and relay the inputs to the computing device 408. The controller may also provide haptic feedback to users. The computing device 408 may be connected to the HMD 410 and the controller through cables or wireless connections. The computing device 408 may control the HMD 410 and the controller to provide the augmented reality content to and receive inputs from one or more users. In some example embodiments, the controller 418 may be a standalone controller or integrated within the HMD 410. The computing device 408 may be a standalone host computer device, an on-board computer device integrated with the HMD 410, a mobile device, or any other hardware platform capable of providing artificial reality content to and receiving inputs from users. In some exemplary embodiments, HMD 410 may include an artificial reality system/virtual reality system (e.g., artificial reality system 100).

Figure 5:
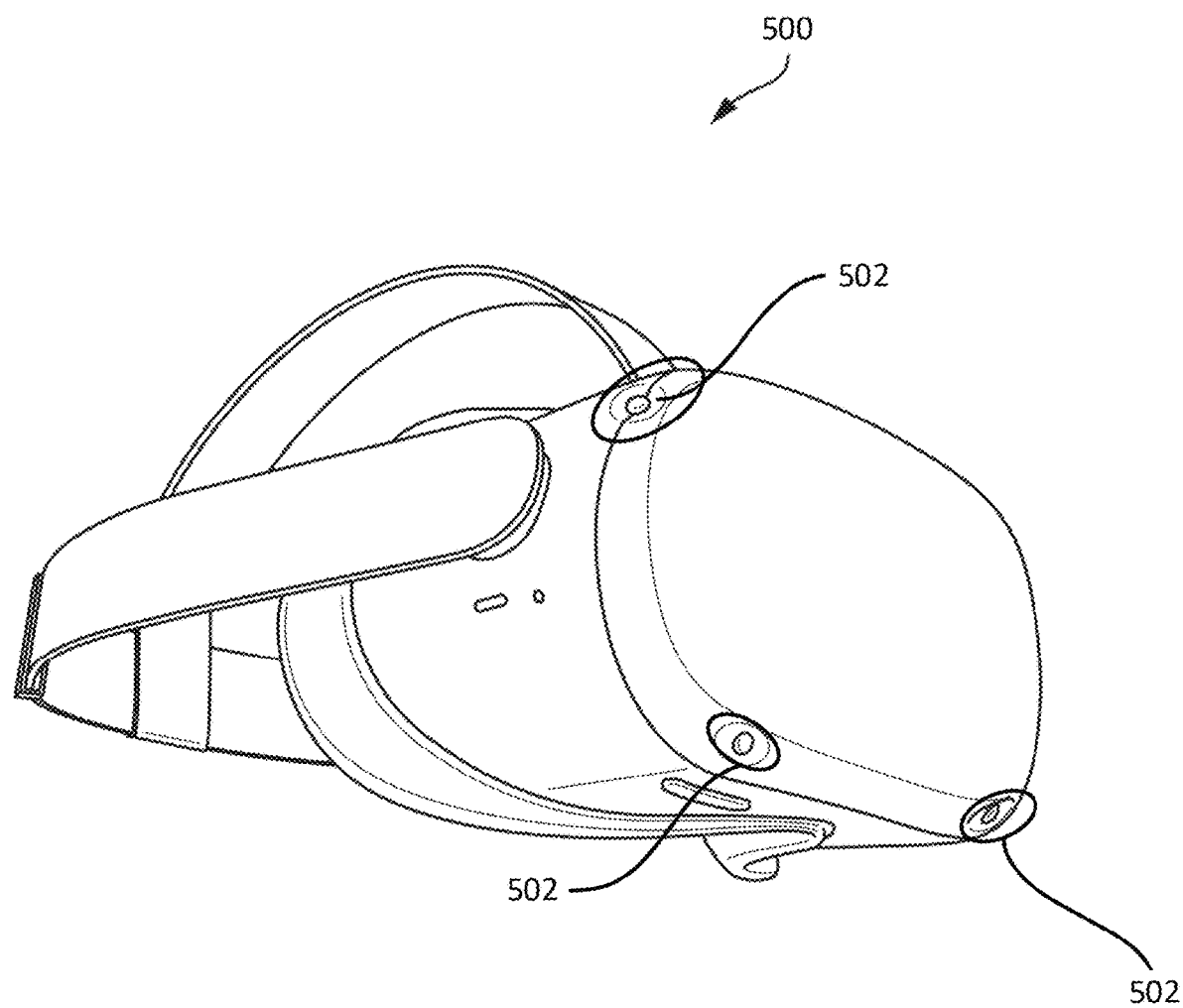
FIG. 5 illustrates another example of an artificial reality system comprising a headset, in accordance with exemplary embodiments of the present invention.

FIG. 5 illustrates another example of an artificial reality system including a head-mounted display (HMD) 500, image sensors 502 mounted to (e.g., extending from) HMD 500, according to at least one exemplary embodiment of the present disclosure. In some exemplary embodiments, image sensors 502 are mounted on and protruding from a surface (e.g., a front surface, a corner surface, etc.) of HMD 500. In some exemplary embodiments, HMD 500 may include an artificial reality system/virtual reality system (e.g., artificial reality system 100). In an exemplary embodiment, image sensors 502 may include, but are not limited to, one or more sensors (e.g., camera(s) 416, a display 414, an audio device 406, etc.). In exemplary embodiments, a compressible shock absorbing device may be mounted on image sensors 502. The shock absorbing device may be configured to substantially maintain the structural integrity of image sensors 502 in case an impact force is imparted on image sensors 502. In some exemplary embodiments, image sensors 502 may protrude from a surface (e.g., the front surface) of HMD 500 so as to increase a field of view of image sensors 502. In some examples, image sensors 502 may be pivotally and/or translationally mounted to HMD 500 to pivot image sensors 502 at a range of angles and/or to allow for translation in multiple directions, in response to an impact. For example, image sensors 502 may protrude from the front surface of HMD 500 so as to give image sensors 502 at least a 180 degree field of view of objects (e.g., a hand, a user, a surrounding real-world environment, etc.).

Figure 6:
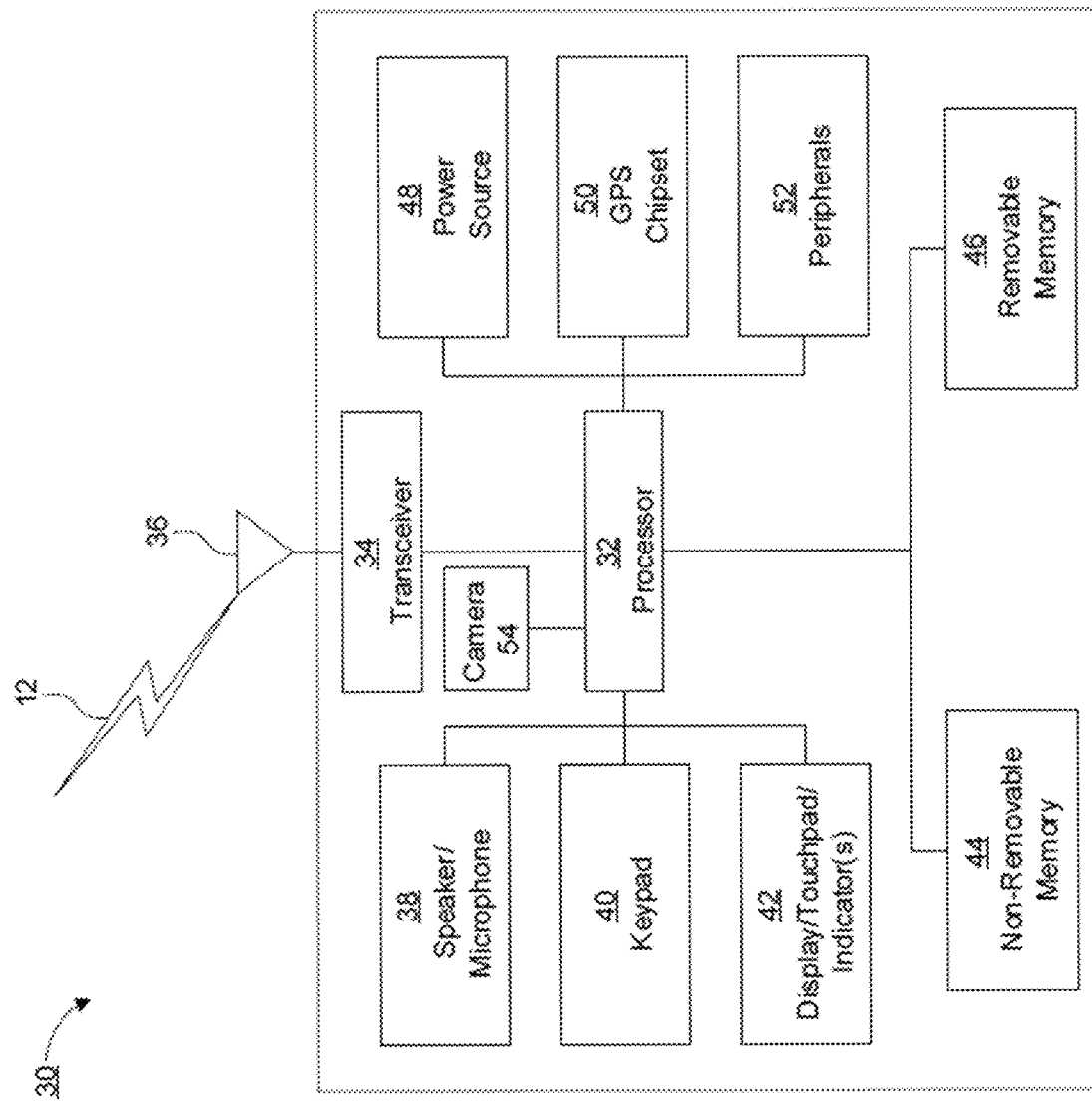
FIG. 6 illustrates a block diagram of an example user equipment device according to an exemplary aspect of the application.

FIG. 6 illustrates a block diagram of an exemplary hardware/software architecture of a UE 30. As shown in FIG. 6, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The UE 30 may also include a camera 54. In an exemplary embodiment, the camera 54 may be a smart camera configured to sense images appearing within one or more bounding boxes. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment. For example, in an embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another embodiment, the transmit/receive element 36 may be configured to transmit and receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an exemplary embodiment.

Figure 7:
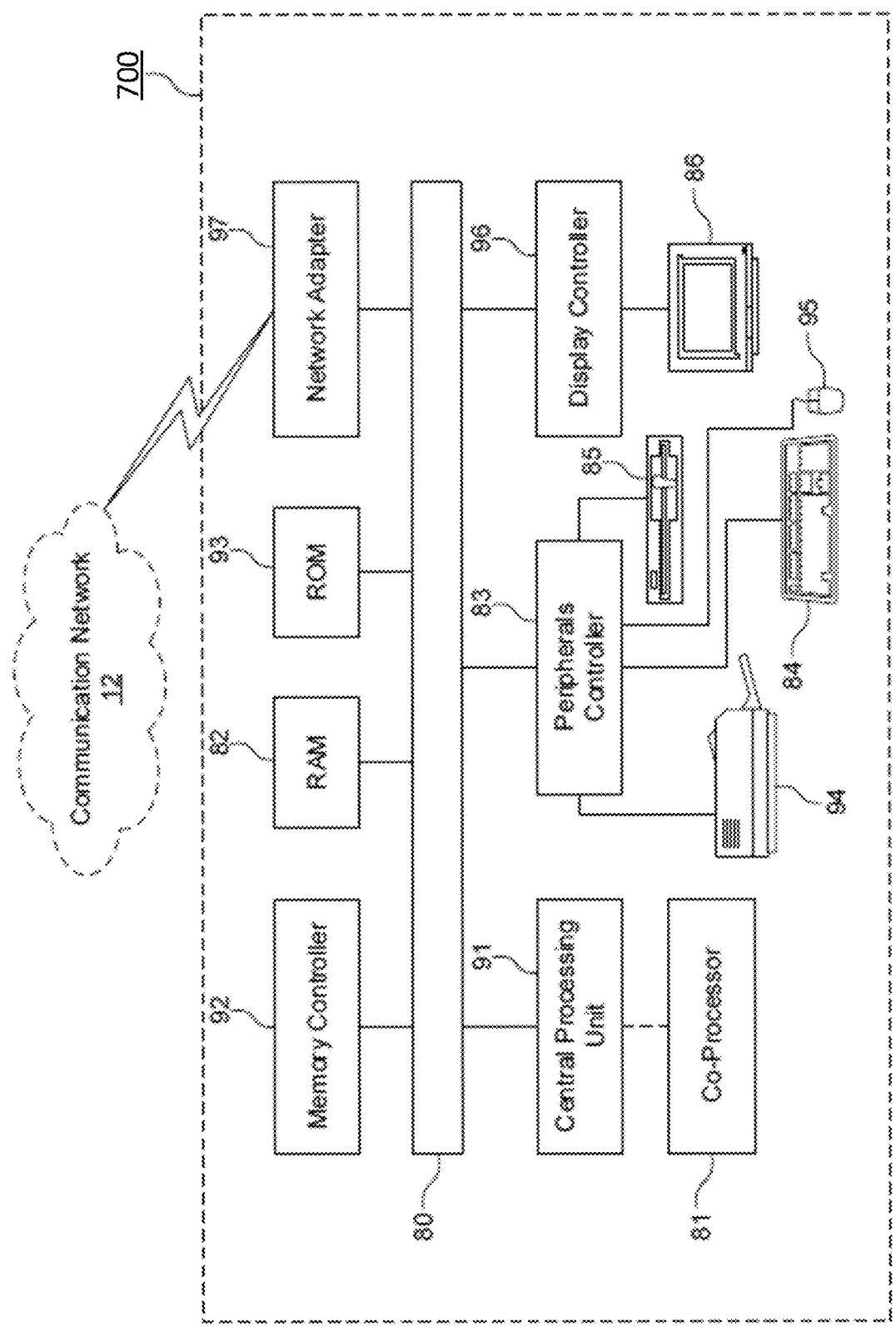
FIG. 7 illustrates a block diagram of an example computing system according to an exemplary aspect of the application.

FIG. 7 is a block diagram of an exemplary computing system 700 which may also be used to implement components of the system or be part of the UE 30. The computing system 700 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 700 to operate. In many workstations, servers, and personal computers, central processing unit 91 may be implemented by a single-chip CPU called a microprocessor. In other machines, the central processing unit 91 may comprise multiple processors. Coprocessor 81 may be an optional processor, distinct from main CPU 91, that performs additional functions or assists CPU 91.

In operation, CPU 91 fetches, decodes, and executes instructions, and transfers information to and from other resources via the computer's main data-transfer path, system bus 80. Such a system bus connects the components in computing system 700 and defines the medium for data exchange. System bus 80 typically includes data lines for sending data, address lines for sending addresses, and control lines for sending interrupts and for operating the system bus. An example of such a system bus 80 is the Peripheral Component Interconnect (PCI) bus.

Memories coupled to system bus 80 include RAM 82 and ROM 93. Such memories may include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space: it cannot access memory within another process's virtual address space unless memory sharing between the processes has been set up.

In addition, computing system 700 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 700. Such visual output may include text, graphics, animated graphics, and video. Display 86 may be implemented with a cathode-ray tube (CRT)-based video display, a liquid-crystal display (LCD)-based flat-panel display, gas plasma-based flat-panel display, or a touch-panel. Display controller 96 includes electronic components required to generate a video signal that is sent to display 86.

Further, computing system 700 may contain communication circuitry, such as for example a network adaptor 97, that may be used to connect computing system 700 to an external communications network, such as network 12 of FIG. 6, to enable the computing system 700 to communicate with other nodes (e.g., UE 30) of the network.

Figure 8:
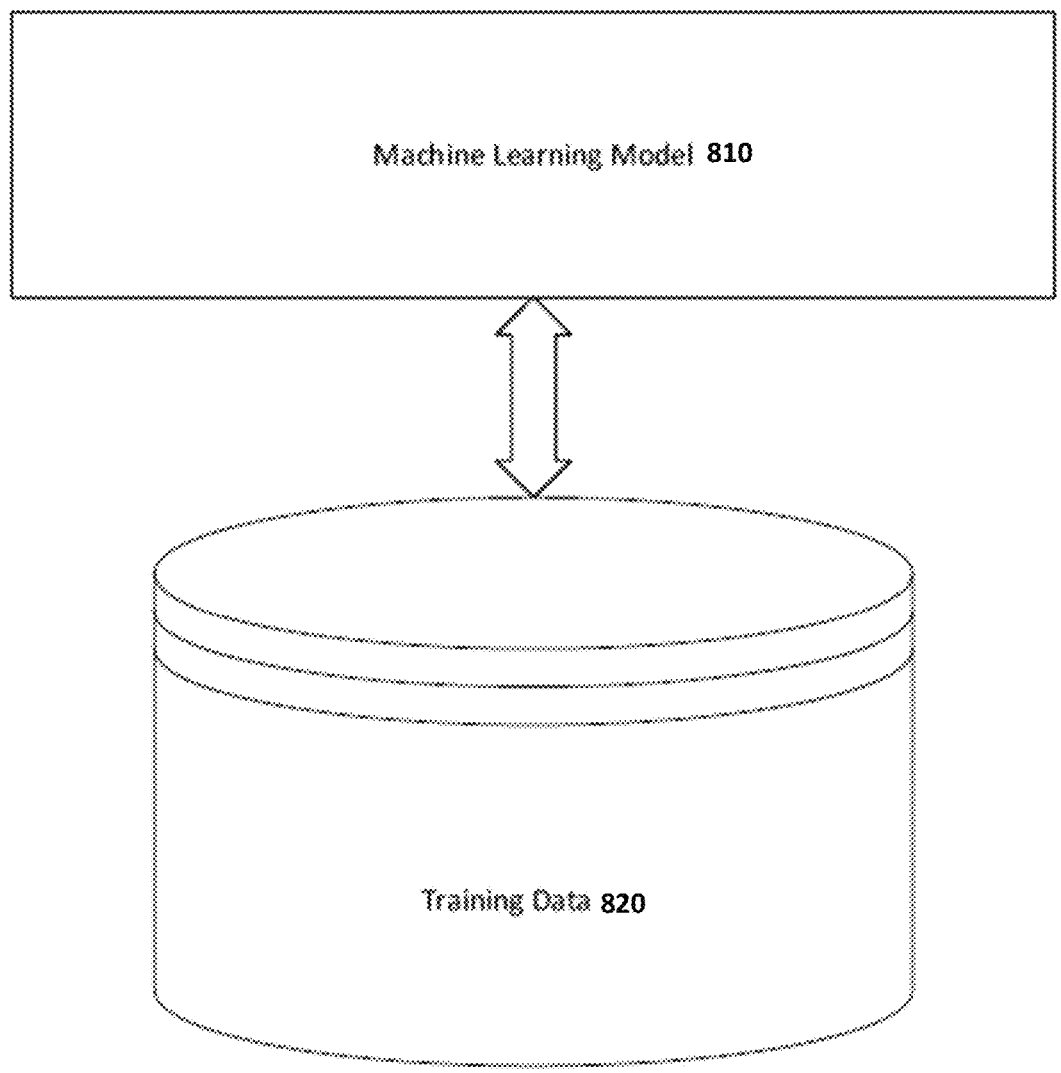
FIG. 8 illustrates a machine learning and training model in accordance with exemplary embodiments of the present invention.

FIG. 8 illustrates a framework 800 employed by a software application (e.g., algorithm) for evaluating attributes of a gesture (e.g., gestures 110). The framework 800 may be hosted remotely. Alternatively, the framework 800 may reside within the UE 30 shown in FIG. 6 and/or be processed by the computing system 700 shown in FIG. 7. The machine learning model 810 is operably coupled to the stored training data in a database 820.

In an exemplary embodiment, the training data 820) may include attributes of thousands of objects. For example, the object may be a hand position. Attributes may include, but are not limited to, the size, shape, orientation, position of a hand, etc. The training data 820) employed by the machine learning model 810 may be fixed or updated periodically. Alternatively, the training data 820 may be updated in real-time based upon the evaluations performed by the machine learning model 810 in a non-training mode. This is illustrated by the double-sided arrow connecting the machine learning model 810 and stored training data 820.

In operation, the machine learning model 810 may evaluate attributes of images/videos obtained by hardware (e.g., of the AR device 120, UE 30, etc.). For example, the camera 124 of AR device 120 and/or camera 54 of the UE 30 shown in FIG. 6 senses and captures an image/video, such as for example hand positions, hand movements (e.g., gestures) and/or other objects, appearing in or around a bounding box of a software application. The attributes of the captured image (e.g., captured image of a gesture(s)) may be then compared with respective attributes of stored training data 820 (e.g., prestored training gestures). The likelihood of similarity between each of the obtained attributes (e.g., of the captured image of a gesture(s)) and the stored training data 820) (e.g., prestored training gestures) is given a confidence score. In one exemplary embodiment, if the confidence score exceeds a predetermined threshold, the attribute is included in an image description (e.g., thumbs up gesture, thumbs down gesture, etc.) that is ultimately communicated to the user via a user interface of a computing device (e.g., UE 30, computing device 408). In another exemplary embodiment, the description may include a certain number of attributes which exceed a predetermined threshold to share with the user. The sensitivity of sharing more or less attributes may be customized based upon the needs of the particular user.

Figure 9:
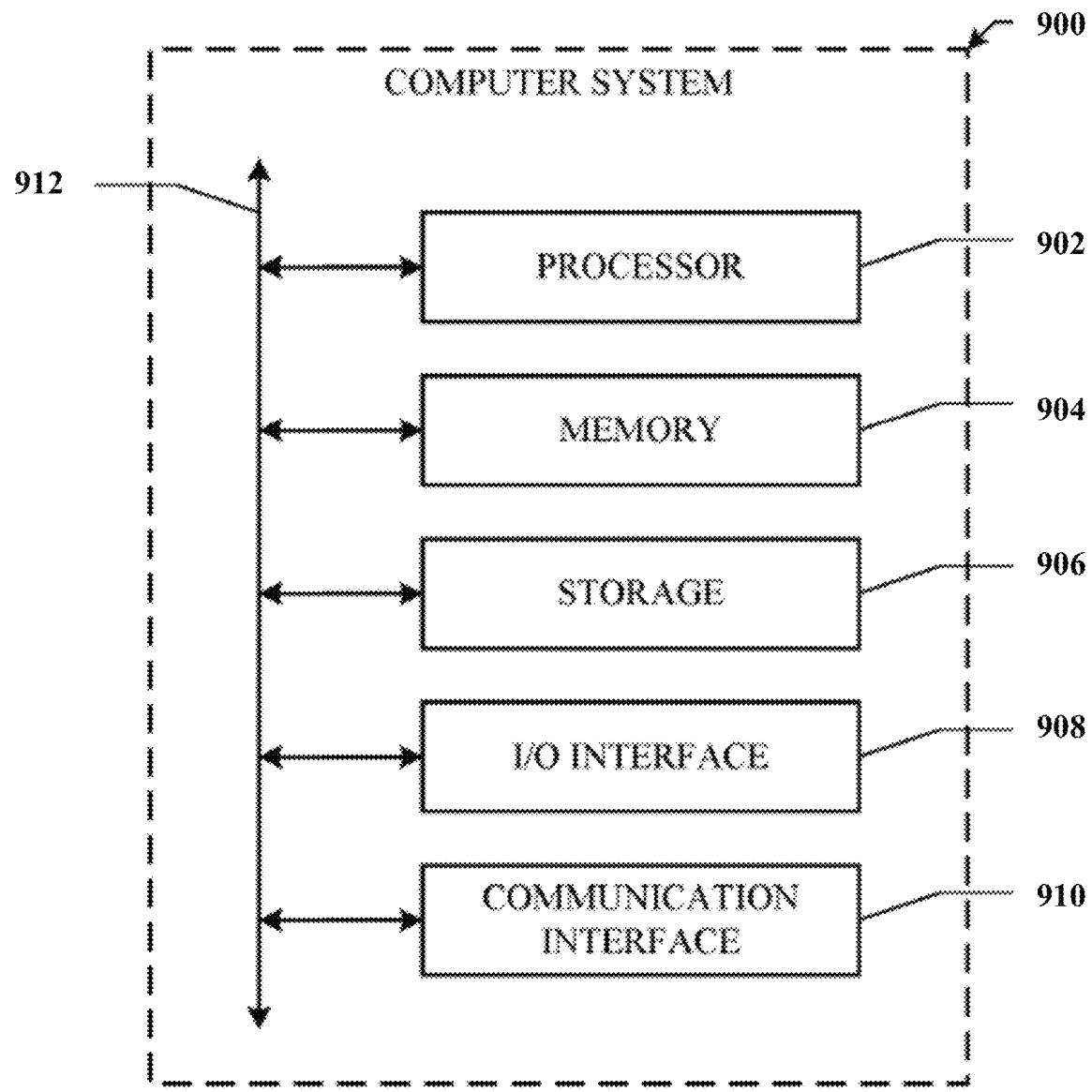
FIG. 9 illustrates a computing system in accordance with exemplary embodiments of the present invention.

FIG. 9 illustrates an example computer system 900. In exemplary embodiments, one or more computer systems 900 perform one or more steps of one or more methods described or illustrated herein. In particular embodiments, one or more computer systems 900 provide functionality described or illustrated herein. In exemplary embodiments, software running on one or more computer systems 900 performs one or more steps of one or more methods described or illustrated herein or provides functionality described or illustrated herein. Exemplary embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900: be unitary or distributed: span multiple locations: span multiple machines: span multiple data centers: or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In exemplary embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In exemplary embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906: decode and execute them: and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on: the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs): be a multi-core processor: or include one or more processors 902. Although this disclosure describes and illustrates a particular processor, this disclosure contemplates any suitable processor.

In exemplary embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In exemplary embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In exemplary embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In exemplary embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In exemplary embodiments. I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate. I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In exemplary embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed:

1. An artificial reality device comprising at least one processor and a non-transitory memory including computer-executable instructions which, when executed by the processor, cause the artificial reality device to:
   determine, based on a first user interaction with the artificial reality device, a type of impairment comprising at least one of a visual impairment or an auditory impairment;
   initiate a gesture recognition mode, based on the type of impairment, to evaluate a second user interaction with the artificial reality device;
   cause a camera associated with the artificial reality device to operate in the gesture recognition mode;
   receive at least one image of a gesture captured by the camera;
   identify and evaluate the gesture, wherein the gesture is indicative of a user command;
   execute the user command in response to the evaluated gesture; and
   generate feedback confirming execution of the user command.

2. The artificial reality device of claim 1, wherein the instructions, when executed by the processor, further cause the artificial reality device to:
   initiate the gesture recognition mode via at least one of a user operating the artificial reality device, a physical selection, an auditory command, or a lapse of a period of time.

3. The artificial reality device of claim 1, wherein the instructions, when executed by the processor, further cause the artificial reality device to:
   provide the generated feedback via at least one of an audio output, a visual output, or a sensory output.

4. The artificial reality device of claim 1, wherein the instructions, when executed by the processor, further cause the artificial reality device to:
   display the generated feedback via a user interface.

5. The artificial reality device of claim 1, wherein the instructions, when executed by the processor, further cause the artificial reality device to:
   evaluate the gesture via a trained machine learning model comprising one or more trained gestures.

6. The artificial reality device of claim 1, wherein the user command comprises at least one of a selection, a rejection, or an interaction with the artificial reality device.

7. The artificial reality device of claim 1, wherein the artificial reality device comprises at least one of artificial reality glasses or an artificial reality headset.

8. The artificial reality device of claim 1, wherein the gesture comprises one or more of a thumbs up, a thumbs down, a directional indication, a swiping motion, a pinching motion, or an expansion motion.

9. A method for interacting with an artificial reality device comprising:

determining, based on a first user interaction with the artificial reality device, a type of impairment comprising at least one of a visual impairment or an auditory impairment;

initiating a gesture recognition mode, based on the type of impairment, to evaluate a second user interaction with the artificial reality device;

causing, via the artificial reality device, a camera to operate in the gesture recognition mode;

receiving at least one image of a gesture captured by the camera associated with the artificial reality device;

identifying and evaluating the gesture;

executing a user command in response to the evaluated gesture; and generating feedback, via the artificial reality device, in response to execution of the user command.

10. The method of claim 9, further comprising:
initiating the gesture recognition mode via at least one of a user operating the artificial reality device, a physical selection, an auditory command, or a lapse of a period of time.

11. The method of claim 9, further comprising:
providing the generated feedback via at least one of an audio output, a visual output, or a sensory output.

12. The method of claim 9, further comprising:
displaying the generated feedback via a user interface.

13. The method of claim 9, further comprising:
evaluating the gesture via a trained machine learning model comprising one or more trained gestures.

14. The method of claim 9, wherein the user command comprises at least one of a selection, a rejection, or an interaction with the artificial reality device.

15. The method of claim 9, wherein the artificial reality device comprises at least one of artificial reality glasses or an artificial reality headset.

16. The method of claim 9, wherein the gesture comprises one or more of a thumbs up, a thumbs down, a directional indication, a swiping motion, a pinching motion, or an expansion motion.

17. A non-transitory computer-readable storage medium storing instructions that, when executed, cause:

determining, based on a first user interaction with an artificial reality device, a type of impairment comprising at least one of a visual impairment or an auditory impairment;

initiating a gesture recognition mode, based on the type of impairment, to evaluate a second user interaction with the artificial reality device;

facilitating, via the artificial reality device, a camera to operate in the gesture recognition mode;

receiving at least one image of a gesture captured by the camera associated with the artificial reality device;

identifying and evaluating the gesture;

executing a user command in response to the evaluated gesture; and generating feedback, via the artificial reality device, in response to execution of the user command.

18. The non-transitory computer-readable storage medium of claim 17, wherein the instructions, when executed, further cause:
initiating the gesture recognition mode via at least one of a user operating the artificial reality device, a physical selection, an auditory command, or a lapse of a period of time.

19. The non-transitory computer-readable storage medium of claim 17, wherein the instructions, when executed, further cause:
evaluating the gesture via a trained machine learning model comprising one or more trained gestures.

20. The non-transitory computer-readable storage medium of claim 17, wherein the gesture comprises one or more of a thumbs up, a thumbs down, a directional indication, a swiping motion, a pinching motion, or an expansion motion.

* * * * *